United States Patent

[11] 3,589,580

| | | |
|---|---|---|
| [72] | Inventor | August Hendrik Maria Smulders<br>Wassenaar, Netherlands |
| [21] | Appl. No. | 865,639 |
| [22] | Filed | Oct. 13, 1969 |
| [45] | Patented | June 29, 1971 |
| [73] | Assignee | N.V. Industrieele<br>Handelscombinatce, Netherlands |
| [32] | Priority | Oct. 14, 1968 |
| [33] | | Netherlands |
| [31] | | 68.146 78 |

[54] APPARATUS FOR LAYING PIPE ON THE BOTTOM OF A BODY OF WATER
16 Claims, 4 Drawing Figs.

[52] U.S. Cl. ................................................. 226/108, 226/152, 226/176, 226/187, 226/195, 61/72.1
[51] Int. Cl. ....................................................... B65h 17/22
[50] Field of Search .......................................... 226/152, 187, 176, 121, 195, 108; 61/72.1

[56] References Cited
UNITED STATES PATENTS
3,017,796  1/1962  Auer et al. .................... 226/121 X
3,388,890  6/1968  Born et al. .................... 226/195 X

*Primary Examiner*—Allen N. Knowles
*Attorney*—Young & Thompson

ABSTRACT: Apparatus for laying pipe on the bottom of a body of water is carried by a floating vessel and includes a plurality of opposed pairs of tires mounted for rotation on and relative to axles which in turn are rotatable relative to their bases. Selectively applicable brakes interconnect the axles and tires, and hydraulic means are provided for rotating the tires stepwise to raise the pipe. During the dwell between steps, a hydraulic motor pressurizes a hydraulic accumulator; and during the step, the accumulator rotates the axle with the brake means applied. The apparatus also serves as a brake for lowering the pipe, during which time the accumulator opposes rotation of the tire when the pipe drives the tire; and to limit the action of the accumulator, the brake is at least partially released after a predetermined rotation of the axle. When the brake is released, the accumulator tends to rotate the axle in the opposite direction; but the brake is self-applying, so that equilibrium is established between the action of the brake and the action of the accumulator thereby to apply a substantially constant braking torque.

INVENTOR
AUGUST HENDRIK MARIA SMULDERS
BY Young + Thompson
ATTORNEYS

APPARATUS FOR LAYING PIPE ON THE BOTTOM OF A BODY OF WATER

The present invention relates to apparatus carried by a vessel for laying pipe such as pipeline on the bottom of a body of water such as the bottom of the sea.

When laying pipe of this type, which is ordinarily of indeterminate length and is made up of a number of sections welded together, it is necessary to maintain the pipe under tension. This is because the pipe at the surface of the water is horizontally disposed, or nearly so, and the pipe on the sea floor is of course horizontal; but the pipe between these horizontal portions is disposed in a gradual S-curve. It is to maintain this S-curve, and to avoid undue bending stresses at any point along the pipe, that this tension must be maintained.

In the past, apparatus has been proposed for this purpose, which includes a number of tires that bear and roll against the pipe. It has been proposed in the past to apply a torque to these tires by means of hydraulic motors. However, in the devices known heretofore, undesirable results have occurred when hydraulic motor leakage losses occur. Also, high power has had to be applied to the motors in order to maintain the necessary tension in the pipe.

It is an object of the present invention to provide such apparatus, in which only a relatively low power is needed.

It is also an object of the present invention to provide such apparatus which is useful not only to apply a torque to the pipe when the pipe is being laid, but also to be able to operate in the opposite direction as a positive and powerful device for raising the pipe for the purpose of inspection, maintenance, replacement or repair.

Another object of the present invention is the provision of such apparatus by which a plurality of wheel units can be actuated from a single power source.

Finally, it is an object of the present invention to provide such apparatus which will be relatively simple and inexpensive to manufacture and install, easy to operate, maintain and repair, and rugged and durable in use.

Briefly, the foregoing objects are achieved by providing a plurality of tires arranged in opposed pairs that are staggered lengthwise of the pipe with the tires of adjacent pairs lying in planes that are turned relative to each other. Each tire is mounted for rotation on and relative to an axle, which in turn is mounted on and for rotation relative to a base, the base in turn being swingably mounted for adjustive movement of the tire toward and away from the pipe. The axle and tire are interconnected by selectively applicable brake means. The axle can also be rotated in either direction by hydraulic means: in one direction by a hydraulic pump acting on a cylinder and piston, and in the other direction by a fluid pressure accumulator acting on another cylinder and piston. The pistons are interconnected by a flexible member that is reeved about and movable with the axle, so that the pistons move in opposite directions. The brake tends to be continuously applied; but upon rotation of the axle through a predetermined angle in a direction to lower the pipe to the sea bed, the brake is disengaged at the same time that the accumulator is pressurized, so that the released axle tends to be rotated back through a part of that angle by the accumulator, whereupon the brake is reapplied and so on until an equilibrium braking torque is established. To rotate the axle in the other direction, so as to raise the pipe, high hydraulic pressure is intermittently applied to the cylinder other than that which is associated with the accumulator while the brake is released, and to return under the action of the accumulator with the brake engaged so as to raise the pipe. Other objects, features and advantages of the present invention will become apparent from a consideration of the following description, taken in connection with the accompanying drawings, in which:

Figure 1:
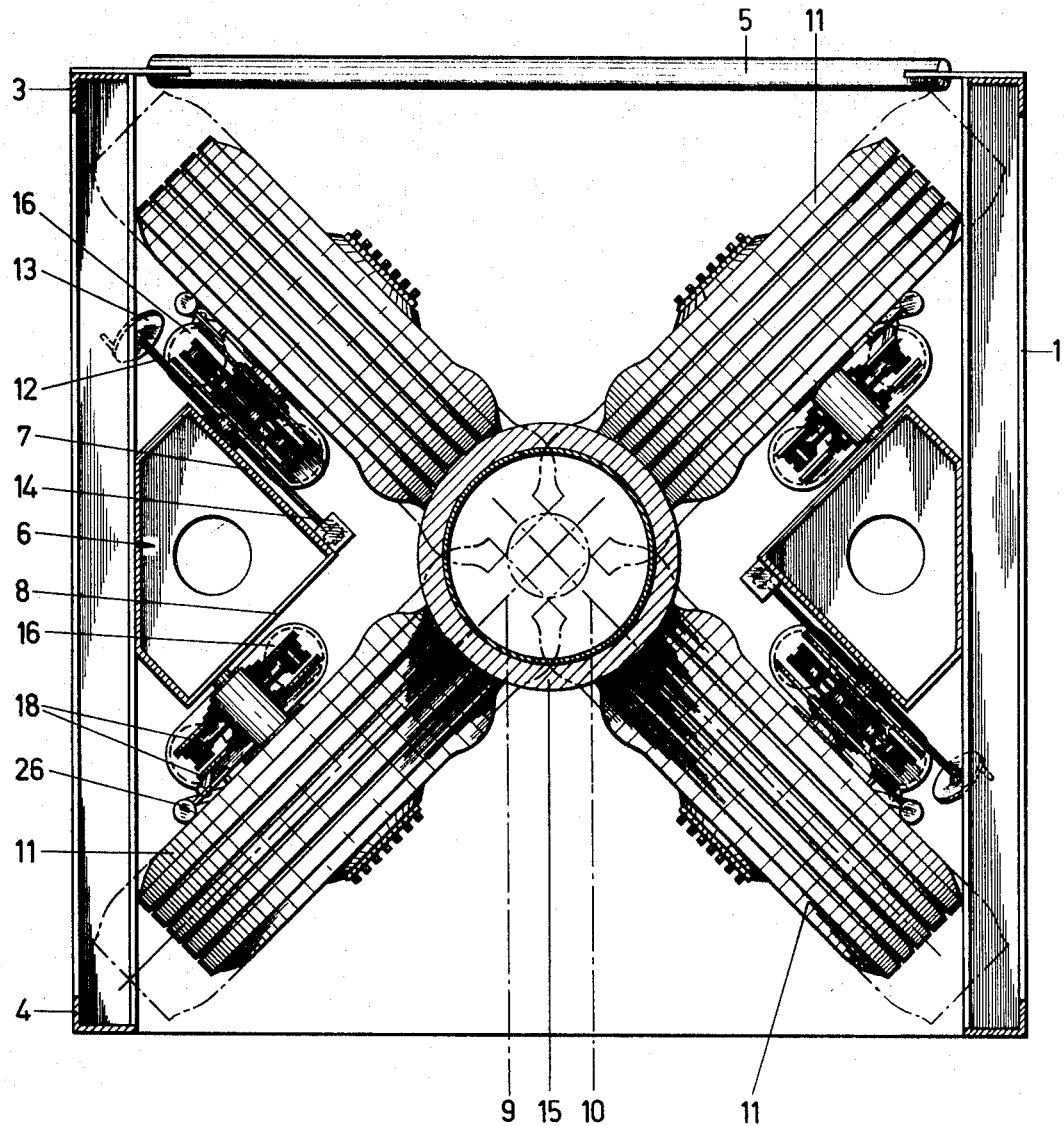
FIG. 1 is a view of apparatus according to the present invention, in a plane perpendicular to the axis of the pipe.

Referring now to the drawings in greater detail, there is shown apparatus according to the present invention, including a rectangular frame 1 the vertical parts of which are formed by a lattice construction 2 (FIG. 2) between horizontally extending channels 3 and 4, said vertical parts being connected to each other at the top by a horizontal lattice 5 and being secured to the vessel (not shown) through the channels 4. Hollow girders 6 are secured to the lattice construction 2 on the midportions of opposite sides of the frame 1 and have inwardly facing walls 7 and 8 that are disposed parallel to the diagonal planes 10 and 9, respectively, that extend between the corners of frame 1.

The wheel units 11 are mounted on each girder 6, some on the walls 7 and the others on the walls 8 thereof. There are thus in the illustrated embodiment four wheel units as viewed in FIG. 1, but more than four as viewed in FIG. 2.

Figure 3:
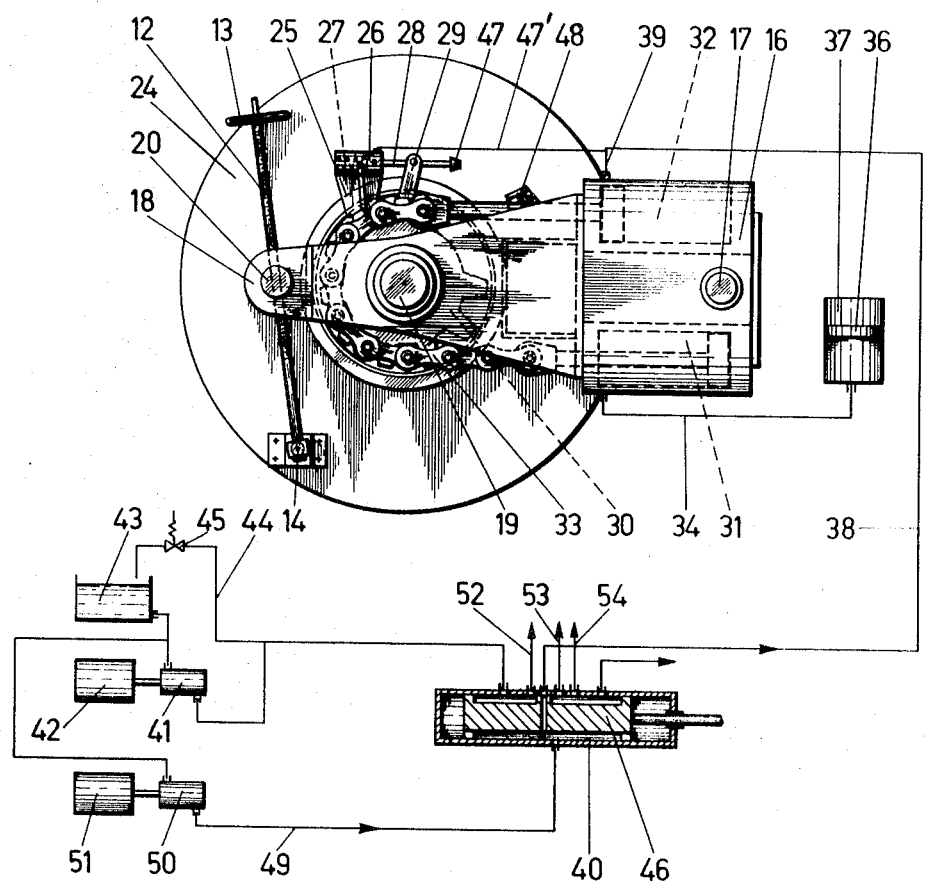
FIG. 3 is a somewhat schematic side elevational view of an individual wheel unit according to the present invention showing also the hydraulic system thereof.
Figure 4:
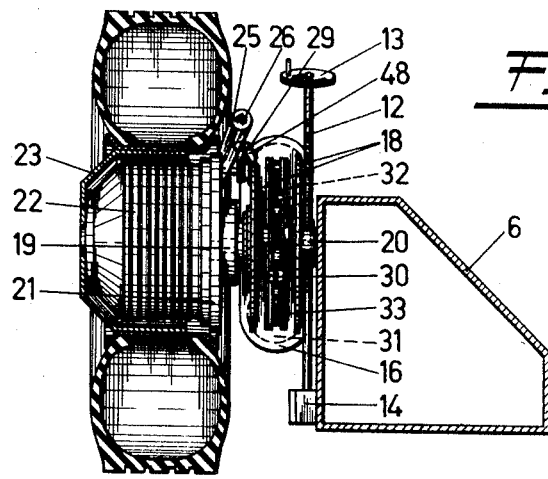
FIG. 4 is a cross-sectional view of the structure of FIG. 3, in the plane of the axis of the wheel.

As best seen in FIG. 3 each wheel unit includes a screw-threaded spindle 12 which is rotated by handwheel 13 at one end and is rotatably mounted in a universal joint 14 at the other end, the universal points 14 being secured to the girders 6 as seen in FIG. 1. Each wheel unit 11 includes a pneumatic tire 24 to bear frictionally against the pipe 15 to be transported. Each wheel unit also includes a base 16 pivotally mounted on a adjacent girder 6 by means of a hinge pin 17. A fork 18 extends from base 16 and carries an axle 19 freely rotatably mounted therein. Axle 19 entends to one side of fork 18 to support the tire 24.

At its outer end, fork 18 carries an internally screw-threaded sleeve 20 with which spindle 12 is in screw-threaded engagement. Rotation of handwheel 13 thus swings fork 18 and axle 19 and base 16 about hinge pin 17.

Axle 19 also carries a brake-anchoring plate 21 fixedly secured thereto; and brake shoes (not shown) are carried by plate 21 in a position to grip from within the brake drum 22 to which is secured the rim 23 of the tire 24.

A holder 25 comprises a hydraulic cylinder 26 and a spring 27 is mounted on plate 21. A piston is disposed in cylinder 26, and spring 27 acts on the piston to urge the piston to the right as seen in FIG. 3. The piston has a piston rod 28 that acts on a brake control lever 29. The lever 29 is pivotally mounted on plate 21; and upon clockwise movement relative to plate 21 acts to apply the brake shoes to the interior of brake drum 22 thereby to apply the brake to retard rotation of the tire. Spring 27 thus urges the brake toward applied position.

As is also seen in FIG. 3, gear segment 30 is fixed on axle 19. Two cylinders 31 and 32 are carried by base 16. The piston rods of the pistons in the cylinders 31 and 32 are connected to each other by means of a chain 33 reeved about and in mesh with gear segment 30. Cylinder 31 communicates hydraulically through a conduit 34 with one side of a piston 36 disposed in a pressure accumulator 37. Accumulator 37 is filled with gas and is closed on the side of piston 36 which is opposite conduit 34, that is, the upper side as seen in FIG. 3. The oleopneumatic system 31, 34, 36, 37 is thus a closed system which can store and release energy, by the cushioning effect of the gas above the piston 36 as seen in FIG. 3. Of course, this gas could be replaced by a spring (not shown).

A hydraulic circuit for cylinders 32 and 36 is provided, comprising a slide valve 40 which is supplied by a low-pressure hydraulic pump 41 driven by a motor 42, from a reservoir 43 through a circuit including a bypass conduit 44 controlled by a pressure-relief valve 45. The slide valve 40 includes a spool 46 which, when slid to the right of its FIG. 3 position, interconnects pump 41 with conduits 38 and 39, and also with conduit 47′, thereby to supply low-pressure hydraulic fluid to cylinders 32 and 26. The purpose of this low-pressure supply is to maintain the chain 33 taut.

Let it be assumed that a length of pipe is to be laid on the sea floor, and that to do so, the vessel is hauled to the right as seen in FIG. 3. This means that the pipe will travel to the left as seen in FIG. 3 relative to the wheel unit, and will contact the lower portion of the tire 24 as seen in FIG. 3. The wheel unit will rotate clockwise as seen in FIG. 3, so that the brake shoes will tend to rotate plate 21 clockwise, which in turn will tend to rotate axle 19 and gear segment 30 clockwise, so that the piston in cylinder 31 will be pulled to the left as seen in FIG. 3. This of course will be opposed by the oleopneumatic system 31, 34, 36 and 37. Against the resistance of this oleopneumatic system, the holder 25 and cylinder 26 and spring 27 and rod 28 and lever 29 will turn clockwise as seen in FIG. 3, until an abutment 47 on rod 28 contacts a fixed abutment 48 on fork 18. Once this happens, continued clockwise rotation of plate 21 will thereafter cause lever 29 to swing counterclockwise relative to plate 21 which tends to disengage the brake and permit the oleopneumatic system 31—37 to relieve itself by turning the gear segment 30 and axle 19 and plate 21 counterclockwise relative to tire 24, in a direction to return the parts other than tire 24 to their FIG. 3 position. But as soon as the pressure of abutment 47 on abutment 48 is relieved, then the lever 29 tends to swing clockwise again to reapply the brake, whereupon the whole system again turns clockwise to release the brake, and so on until an equilibrium is reached at which a predeterminable braking pressure is exerted by tire 24 on the pipe 15; that is to say, the tire 24 turns with the pipe 15 while the brake slips to a predeterminable degree. In this way, a predetermined braking action will be achieved, which will result in a predetermined tensile stress imposed on the pipe while it is being laid, which is a condition necessary to the controlled laying of pipe such as a submarine pipeline of indeterminate length.

The apparatus of the present invention is also useful to move the pipe in the opposite direction, for example to raise the pipe for inspection, maintenance, replacement or repair. In this case, the pipe moves to the right relative to the wheel unit as seen in FIG. 3, in contact with the underside of the tire 24; and the hydraulic system operates so that the apparatus functions as an intermittent rotary conveyor, with intermittent counterclockwise rotation of tire 24 as seen in FIG. 3. To this end, a high-pressure hydraulic pump 50 is provided, driven by a motor 51 and supplied from the reservoir 43, which feeds high-pressure hydraulic fluid through a conduit 49 to valve 40. In this case, however, the spool 46 of valve 40 is set as in FIG. 3, so that the high-pressure fluid is supplied to cylinders 26 and 32. High-pressure fluid in cylinder 26 overcomes spring 27 to swing lever 29 counterclockwise as seen in FIG. 3 and release the brake. High-pressure fluid in cylinder 32 moves the piston to the right and compresses the oleopneumatic system 31—37. Then, movement of spool 46 out of the FIG. 3 position releases the high pressure in the conduits 38, 39 and 47', and spring 27 reapplies the brake, whereupon the pressurized or cocked oleopneumatic system 37—37 causes the piston in cylinder 31 to move to the right as seen in FIG. 3 which rotates tire 24 clockwise to move the pipe an increment of distance to the right as seen in FIG. 3. When the spool 46 is moved back to the FIG. 3 position, then high pressure is again applied in cylinders 26 and 32 and the brake is released and the piston in cylinder 32 moves to the right as seen in FIG. 3, to compress the oleopneumatic system 31—37 in preparation for a further power stroke. When the piston in cylinder 32 moves to the right as seen in FIG. 3, the parts 30, 19 and 21 are moved clockwise as seen FIG. 3; but because the brake is released, the tire 24 will be held stationary by its contact with the pipe 15. Then, when the spool 46 is again moved out of the FIG. 3 position, the brake will be reapplied and another power stroke will be made by which the pipe will be moved another increment of distance to the right as seen in FIG. 3. Spool 46, during this latter operation, may be reciprocated by motor means (not shown), or manually; and of course valve 40 may be of the rotating kind in which the spool 46 is a rotor that rotates continuously or intermittently in one direction.

The connections 52, 53, and 54, shown in FIG. 3, of course extend to other wheel units through hydraulic circuitry like that of FIG. 3. Thus, it will be appreciated that a plurality of wheel units may be actuated in any desired sequence, thereby to make maximum use of a single pumping and valve unit as seen at the bottom of FIG. 3, while at the same time enjoying the benefit of plural wheel units.

Figure 2:
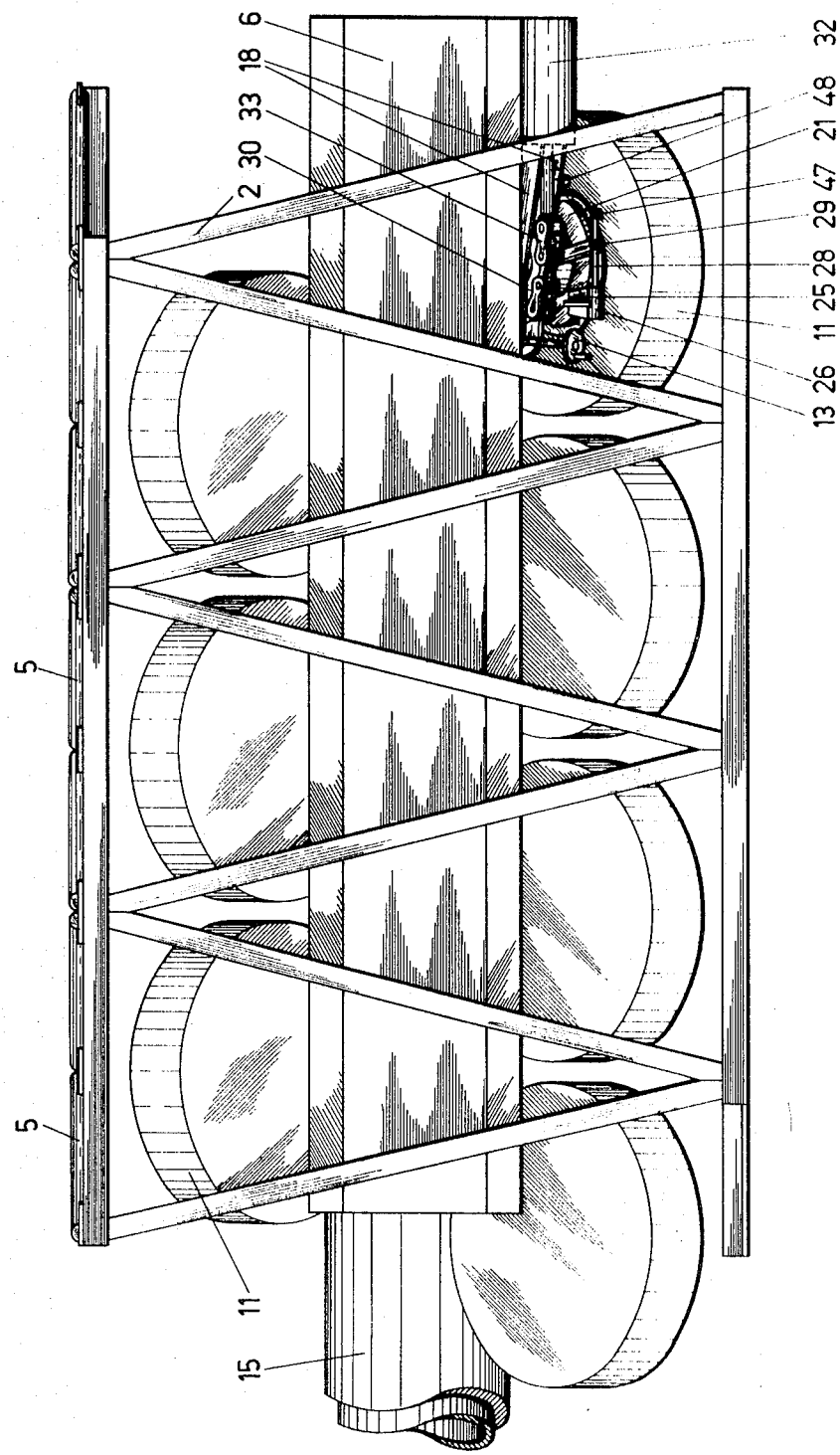
FIG. 2 is a side elevational view of the structure of FIG. 1.

The advantage of so arranging and adjustably mounting the wheel units as shown in FIGS. 1 and 2 will now be apparent. The wheel units 11 are arranged in opposed pairs; but these pairs are staggered as shown in FIG. 2, so that even if the pipe 15 is quite small in diameter, as shown in phantom line at the center of FIG. 1, the tires 24 will nevertheless not interfere with each other. It will also be recognized, that as an enlarged welded joint between two lengths of pipe 15 passes through the wheel units, the individual wheel units can retracted to the phantom line positions shown at the corners of the structure shown in FIG. 1, so as to permit the enlarge weld to pass. At the same time, however it will be recognized that a given moment, only two such wheel units need be retracted, which of course are the wheel units of an oppositely disposed pair of wheel units. The other wheel units can remain in supporting or tensioning relationship to the pipe with relatively little loss of support or tension.

In the light of the above discussion, therefore, it will be evident that only relatively low power is necessary to operate the apparatus of the present invention, even with a plurality of wheel units. Substantially constant torque upon laying the pipe is maintained by the equilibrium between the oleopneumatic system 31—37 on the one hand, and the brake system 27, 28, 29, 47 and 48, on the other hand. During hoisting of the pipe, high-pressure fluid is intermittently required to cock or compress the oleopneumatic system 31—37 by which the energy is conserved or stored; and when not required for a given wheel unit, this high-pressure pump capacity is available for another wheel unit. It will also be recognized that upon rolling movement of the vessel on the sea, by which the wheel unit and the pipe have reciprocating movement relative to each other, the arrangement of the cylinders 31 and 32, with the chain 33 maintained taut by the low-pressure hydraulic fluid from pump 41 will provide energy conservation so that desired tensile relationship can be maintained between the wheel units and the pipe without the performance of substantial work.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand.

What I claim is:

1. In apparatus for laying a pipe on the bottom of a body of water, said apparatus being carried by a vessel on the water and including a plurality of wheel units each having a tire that bears against the pipe in the direction of the center line of the pipe; the improvement comprising a base, an axle mounted on the base for rotation of the axle relative to the base, the tire being concentric with the axle for rotation relative to the axle, selectively engageable brake means acting between the axle and the tire, power means for exerting a torque on the axle in one direction, and accumulator means for storing energy when said power means exerts torque on the axle and for releasing energy by applying to the axle a torque in the opposite direction.

2. Apparatus as claimed in claim 1, said power means comprising a cylinder and piston assembly and means for supplying a fluid under pressure to the cylinder of said assembly.

3. Apparatus as claimed in claim 2, said fluid supply means comprising a hydraulic pump.

4. Apparatus as claimed in claim 1, and means continuously urging said brake means toward engaged position said accumulator means resisting rotation of said axle and tire together as a unit when said brake means is applied, and means at least partially releasing said brake means upon a predetermined rotation of said axle and tire together as a unit thereby to limit the force with which said accumulator means opposes said rotation.

5. Apparatus as claimed in claim 4, and abutment means movable with said brake means upon rotation of said axle and tire together as a unit and engageable with fixed abutment means at least partially ro release said brake means.

6. Apparatus as claimed in claim 4, said accumulator means comprising a cylinder and a piston movable in said cylinder against the action of a body of fluid, and a tension member interconnecting said axle and said piston to move said piston against said action of a body of fluid upon rotation of the tire and axle together as a unit.

7. Apparatus as claimed in claim 6, and abutment means movable with said brake means upon rotation of said axle and tire together as a unit and engageable with fixed abutment means at least partially to release said brake means.

8. Apparatus as claimed in claim 1, and means operable upon rotation of said axle through a predetermined angle for disengaging the brake means.

9. Apparatus as claimed in claim 1, said accumulator means comprising cylinder and piston means, a closed body of fluid in communication with one side of a piston of said cylinder-and-piston means, and means for supplying fluid under pressure to another side of a said piston of said cylinder-and-piston means from a source of fluid under pressure.

10. Apparatus as claimed in claim 9, said cylinder-and-piston means comprising a pair of cylinders with a piston slidable in each cylinder, the pistons being interconnected by a flexible member that has a portion trained about and movable with said axle so that said pistons move in opposite directions in their respective cylinders upon rotation of the axle relative to the base, one said piston communicating with a body of fluid and acting to compress the body of fluid upon rotation of the axle, and means for supplying fluid under pressure to the other cylinder so as to rotate the axle.

11. Apparatus as claimed in claim 10, and abutment means movable with said brake means upon rotation of said axle and tire together as a unit and engageable with fixed abutment means at least partially to release said brake means.

12. Apparatus as claimed in claim 1, there being a plurality of said tires arranged in opposed pairs on opposite sides of the pipe, the tires of each said pair lying in a plane disposed at a substantial angle to the tires of each adjacent pair.

13. Apparatus as claimed in claim 12, and means for selectively individually rotating and braking the tires of each said pair.

14. Apparatus as claimed in claim 13, and means for selectively individually moving the tires of each pair toward or away from the pipe.

15. Apparatus as claimed in claim 12, and rectangular frame means along the diagonal planes of which said tires are disposed.

16. Apparatus as claimed in claim 15, and hollow girders secured midway on either side of the rectangular frame means and having inwardly directed sides on which said bases are swingably mounted.